United States Patent Office 3,234,175
Patented Feb. 8, 1966

3,234,175
SILOXANE COMPOSITIONS AND ELASTOMERS
PREPARED THEREFROM
Roscoe A. Pike, Grand Island, N.Y., assignor to Union
Carbide Corporation, a corporation of New York
No Drawing. Filed Mar. 27, 1961, Ser. No. 98,340
8 Claims. (Cl. 260—37)

This invention relates to improved vulcanizable siloxane compositions and to the elastomers made therefrom. More particularly this invention relates to siloxane compositions vulcanizable to elastomers having excellent low temperature properties and good thermal stability.

It is known that, heretofore, siloxane elastomers having good low temperature properties can be prepared from polysiloxanes having pendant methyl and phenyl groups. These polysiloxanes are expensive to produce and in addition the elastomers prepared therefrom were not very resistant to the attack of aromatic solvents.

It is also known that siloxane elastomers having good low temperature properties can be prepared from polysiloxanes having pendant methyl and ethyl groups. The siloxane elastomers thus prepared suffered from the disadvantage that when subjected to elevated temperatures they lose their elastomeric properties within a relatively short time.

It is an object of this invention to produce siloxane elastomers having excellent low temperature properties, good thermal stability and which are more resistant to solvent degradation than are those low temperature silicon elastomers having pendant methyl and phenyl groups.

It is a further object of this invention to produce siloxane elastomers having excellent low temperature properties and good thermal stability, from copolymeric polysiloxanes containing dimethylsiloxane units, diethyl or ethylmethyl-siloxane units and particular amounts of olefinically unsaturated hydrocarbon siloxane units.

The present invention is based upon my discovery that siloxane elastomers having excellent low temperature properties and improved thermal stability can be produced from compositions comprising (1) Copolymeric dihydrocarbonpolysiloxane gums,
(2) A filler comprising alumina and carbon black, and
(3) An organic peroxide dihydrocarbonpolysiloxane gum curing agent.

The copolymeric dihydrocarbonpolysiloxane gums which are employed in producing the compositions and elastomers of this invention are essentially linear dihydrocarbonpolysiloxanes and contain in their molecular structure particular amounts of certain saturated hydrocarbon groups, namely, methyl groups and ethyl groups and particular amounts of olefinically unsaturated hydrocarbon groups, such as, vinyl, allyl and cyclohexenyl groups. To produce the improved vulcanizable compositions and elastomers of this invention I have found that the amounts of methyl, ethyl and the olefinically unsaturated groups must be maintained within certain hereinafter defined limits. I have found that these groups must be maintained within these limits in order to obtain elastomers characterized by resistance to aromatic solvents, flexibility at low temperatures and thermal stability.

Thus, I have found that of the total number of moles of the saturated hydrocarbon groups and olefinically unsaturated hydrocarbon groups present in the copolymeric dihydrocarbonsiloxane, 4.0 to 8.1 mole percent should be ethyl groups, from 0.0185 to 0.5 mole percent should be olefinically unsaturated groups and from 91.4 to 95.9815 mole percent methyl groups.

More particularly, the copolymeric dihydrocarbonpolysiloxane gums which are employed in producing the compositions and elastomers of this invention are essentially linear dihydrocarbonpolysiloxane gums having a degree of polymerization of about 2000 or higher. These essentially linear dihydrocarbonpolysiloxane gums have viscosities ranging from pourable liquids to materials which will barely flow when unconfined. Such gums can have molecular weights in the range of from 100,000 to 3,000,000 or even higher. These gums are more readily dipicted as containing units of the formulas:

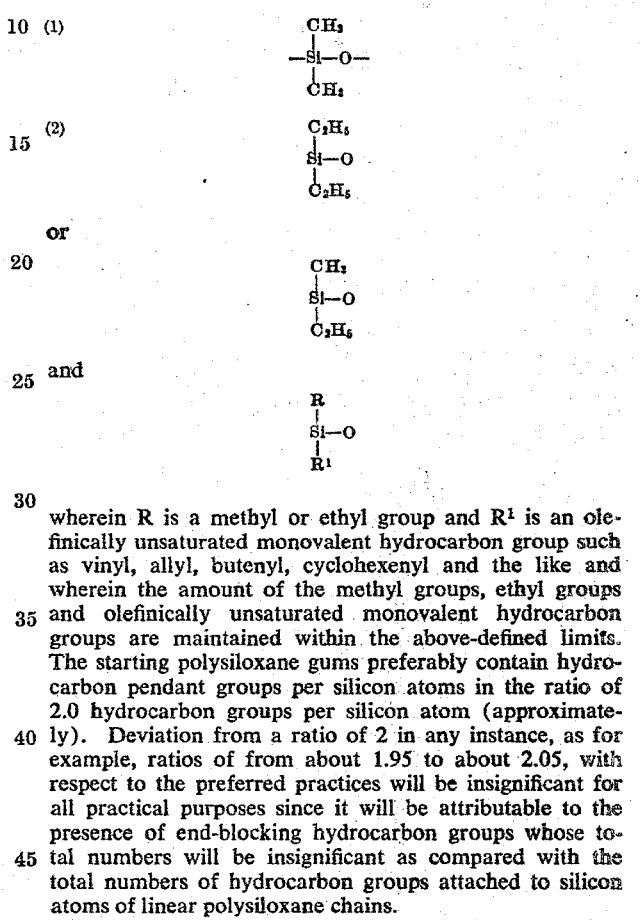

wherein R is a methyl or ethyl group and $R^1$ is an olefinically unsaturated monovalent hydrocarbon group such as vinyl, allyl, butenyl, cyclohexenyl and the like and wherein the amount of the methyl groups, ethyl groups and olefinically unsaturated monovalent hydrocarbon groups are maintained within the above-defined limits. The starting polysiloxane gums preferably contain hydrocarbon pendant groups per silicon atoms in the ratio of 2.0 hydrocarbon groups per silicon atom (approximately). Deviation from a ratio of 2 in any instance, as for example, ratios of from about 1.95 to about 2.05, with respect to the preferred practices will be insignificant for all practical purposes since it will be attributable to the presence of end-blocking hydrocarbon groups whose total numbers will be insignificant as compared with the total numbers of hydrocarbon groups attached to silicon atoms of linear polysiloxane chains.

I have also found, that the filler employed in the compositions and elastomers of this invention is critical. I have found that unless a mixture containing both carbon black and alumina is employed as the filler, the heat stability of the elastomer is deficient. These fillers can be added separately to the siloxane gum on compounding or they can be added as a mixture.

In producing the composition and elastomers of this invention the total amount of the filler mixture can range from as low as 10 parts by weight filler to as high as 80 parts filler per 100 parts by weight of the siloxane gum. However it is preferred to employ the fillers in total amounts of from 20 to 40 parts by weight filler per 100 parts by weight of the siloxane gum. Of the total amount of the filler mixture employed, carbon black can comprise from 9.1 to 90.9 percent by weight of the filler mixture and alumina can comprise from 90.9 to 9.1 percent by weight of the total filler mixture. It is preferred that the filler mixture be comprised of from 37.5 to 62.5 percent by weight carbon black and from 62.5 to 37.5 percent by weight alumina.

In producing the improved siloxane elastomers of this invention I can employ as curing agents, organic peroxides, such as, the dialkylperoxides, the diacylperoxides, and the mixed alkyl acylperoxides. Especially suitable curing agents are the dialkylperoxides which can be graphically depicted by the formula

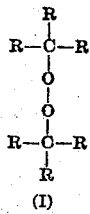

(I)

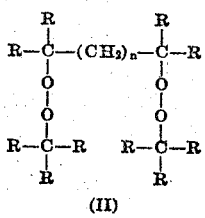

(II)

wherein R represents the same alkyl group throughout or alkyl groups of two or more different types and $n$ is zero (0) or a larger integer.

Among the specific curing agents that I prefer to employ are included:

Di-tertiary-butyl peroxide;
Tertiary-butyl-triethylmethyl peroxide;
2,5-bis(tertiary-butylperoxy)-2,5-dimethylhexane;
Tertiary-butyl-tertiary-triptyl peroxide, the composition of which is represented by the structural formula:

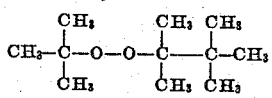

and phenyl substituted ditertiary alkyl peroxides such as dicumyl peroxide.

I can also employ as curing agents, other organic peroxides. Such organic peroxides, when employed in appropriate amounts, will effect the same degree of curing as our improved silicone compounds through the same agencies or through agencies in addition to the unsaturated groups, as for example, through methyl to methyl groups. In such instances not all of the unsaturated groups present necessarily enter into cross-linking reactions. Typical of such peroxides are the acyl peroxides which include benzoyl peroxide, and the like, mixed alkylacyl peroxides which include tertiary butyl perbenzoate, and the like, chloroacyl peroxides such as 1,4-dichlorobenzoyl peroxide, 2,4-dichlorobenzoyl peroxide, monochlorobenzoyl peroxide and the like.

The amount of the curing catalyst employed in producing the siloxane elastomers of this invention can be from 0.1 part catalyst per 100 parts of the siloxane gums to 2.5 parts catalyst per 100 parts gum. It is preferred to employ from 0.5 to 1.5 parts catalyst per 100 parts of the siloxane gum in order to obtain fully cured elastomers.

The dihydrocarbonpolysiloxane gum compositions of this invention are produced by admixing at room temperature the dihydrocarbonpolysiloxane gum, filler and catalyst until a uniform dispersion is obtained.

The admixtures of the dihydrocarbonpolysiloxane gum, filler and curing catalyst are commonly referred to as a "siloxane gum compounds."

Suitable apparatus for preparing the curable siloxane gum compounds of this invention include milling rolls operating at differential speeds, Banbury mixers and the like. According to the milling techniques, the dihydrocarbonpolysiloxane gum is charged onto the roll mill and milled to give a uniform sheet. The filler is then added in suitable amounts and the milling continued until the filler is uniformly dispersed throughout the organopolysiloxane gum. The curing catalyst is then added and the milling continued until uniform dispersion is obtained.

The dihydrocarbonpolysiloxane gum compound is then molded or extruded and cured to an elastomer by heating to a temperature sufficiently elevated to cause the curing agent to decompose thereby curing the siloxane gum compound to an elastomer. The temperature to which the composition is heated will of course depend upon the decomposition temperature of the particular organic peroxide dihydrocarbonpolysiloxane gum curing catalyst employed, thus the temperature can be from about 100° C. to about 300° C. or higher. For example, when a diacyl peroxide such as dibenzoyl peroxide is employed as the curing catalyst the compositions are cured to elastomers by heating to a temperature of about 250° F. for 15 to 20 minutes whereas, when a dialkyl peroxide such as, ditertiary butyl peroxide is employed (where the dihydrocarbonpolysiloxane gum contains silicon-bonded olefinically unsaturated groups), the compositions are cured to elastomers by heating to a temperature of about 340° F. to 20 to 25 minutes.

It is sometimes desirable to age a mixture of the polysiloxane gum and filler prior to adding the curing catalyst thereto. Aging for a period of from about one day to one week at room temperature, or heat-aging at an elevated temperature (above about 250° F.) for a period of from about one to two hours or more provided opportunity for better wetting of the filler by the polysiloxane gum. In addition, precure heat-aging effectively eliminates objectionable volatile matter such as water and absorbed gases (carried into the mixture by the filler) at a stage wherein distortion resulting from gas elimination is not harmful, and thus reduces the amount of gas that must be eliminated by postcure heat-aging at a time when density and structural form must be retained.

At the conclusion of such aging treatments, the curing catalyst can be incorporated into the mixture and the resulting mixture heat-cured to an elastomer. If desired, the elastomer may then be subjected to postcure heat-aging. Such postcure treatments serve to stabilize the physical properties of the elastomer and to improve the electrical properties of the elastomer. Postcuring can be conducted by heating at a temperature of about 350° F., preferably at a temperature of about 480° F., for a period of about twenty-four hours.

Preparation of the starting dihydrocarbon substituted polysiloxanes (siloxane gums) which contain ethyl, methyl and olefinically unsaturated hydrocarbon groups can be carried out by means of any of the procedures whose fundamental principles are known to those skilled in the art. By way of illustration, such polysiloxanes can be produced by following a procedure involving mixing suitable siloxanes in proportions such as to provide in the resulting linear polysiloxane a predetermined number of methyl and ethyl groups and of olefinically unsaturated hydrocarbon groups with respect to the total number of hydrocarbon groups present therein, and subject the mixtures to an appropriate equilibration treatment under controlled conditions to produce linear polysiloxanes of desired molecular weights and viscosities and having methyl, ethyl and olefinically-unsaturated pendant groups attached to the silicon atoms thereof in appropriate amounts as hereinbefore set forth.

Thus, for example, in the production of a linear polysiloxane gum useful as the starting material for the compositions of the invention, a polymer having methyl, ethyl, and vinyl groups bonded to the silicon atoms thereof can be produced by forming an admixture of (1) one or more dimethylcyclosiloxanes such as hexamethylcyclotrisiloxane, octamethylcyclotetrasiloxane, decamethylcyclopentasiloxane and the like, (2) hexaethylcyclotrisiloxane or one or more cyclic methylethylpolysiloxanes, such as, trimethyltriethylcyclotrisiloxane $$[CH_3(C_2H_5)SiO]_3$$

tetramethyltetraethylcyclotetrasiloxane 

and the like; (3) one or more cyclic ethyl or methylvinylpolysiloxanes, such, for example as the trimer

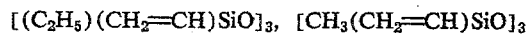

or the tetramer

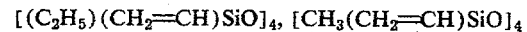

or both, (4) potassium dimethyl silanolate,

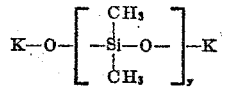

where $y$ is an integer of at least 1, in an amount sufficient to provide thirty (30) parts by weight of potassium ion ($K^+$) per million parts by weight of the siloxanes, (5) cesium hydroxide, in an amount sufficient to furnish from 10 to 500 parts cesium per million parts of the polysiloxanes and preferably from 50 to 300 parts cesium per million parts polysiloxanes, and (6) an amount of one or more monofunctional compounds such as hexamethyldisiloxane calculated to function as end-blockers for limiting the degree of polymerization and, consequently, the lengths and molecular weights of the liner polysiloxane chains and for stabilizing the polymers. After vigorous stirring in order to effect thorough dispersion of the components and the production of a substantially homogeneous product, the mixture is heated in a sealed vessel at a temperature of about 150° C. for a period of time varying from about one hour to two and one-half hours, to produce a gum.

The organopolysiloxane gums employed in the compositions of the invention can also contain small amounts (less than 0.9 percent by weight) of organic end-blocking or chain terminating groups. By way of illustration, the gums can contain small amounts of alkoxy end-blocking groups, such as methoxy, ethoxy, propoxy, butoxy and the like.

The compositions of this invention can also contain as a plasticizer a hydroxy or alkoxy end-blocked dihydrocarbonpolysiloxane oil. While the hydroxy or alkoxy end-blocked dihydrocarbonpolysiloxane oil is not essential to the compositions of this invention, the use of the hydroxy or alkoxy end-blocked oil gives improved milling characteristics to the compositions. The hydroxy and alkoxy end-blocked dihydrocarbonpolysiloxane oils suitable for use in the present invention are those relatively low molecular weight polysiloxane oils whose polymer chains have at least two and as much as thirty-five and more hydrocarbonsiloxy units ($R_2SiO$) per molecule and which contain an average of at least one hydroxyl group per terminal silicon atom of the molecule. Such polysiloxane may be represented by the general formula:

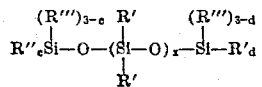

wherein $R'$ and $R''$ are monovalent hydrocarbon radicals, for example alkyl groups such as methyl, ethyl, propyl and the like; aryl groups such as phenyl, naphthyl and the like, aralkyl groups such as benzyl, phenylethyl and the like, alkaryl groups such as, tolyl, xylyl, ethylphenyl and the like; cycloalkyl groups, such as cyclopentyl, cyclohexyl and the like; alkenyl groups such as vinyl, allyl, butenyl, cyclohexenyl and th elike; $R'''$ is a hydroxyl or an alkoxy group such as methoxy, ethoxy, propoxy, and the like, and ($c$) has a value from 0 to 2; ($d$) has a value from 0 to 3; the sum of $c$ and $d$ is not in excess of 4, ($x$) has a value of from 2 to 35 inclusive; and $R'$ as well as $R''$ can be different group members in a molecule.

Most preferred for use in the compositions of this invention are those hydroxy or alkoxy end-blocked polysiloxane oils having from four to twenty dihydrocarbonsiloxy units per molecule.

It is preferred to employ as the polysiloxane oil, a hydroxy or alkoxy end-blocked dihydrocarbon-substituted polysiloxane oil whose hydrocarbon substituents consist of one or more types of hydrocarbon groups taken from the class consisting of methyl, ethyl, phenyl, vinyl, allyl, cyclohexenyl groups. Illustrative of polysiloxane oils suitable for use in my invention are those hydroxy and alkoxy end-blocked dihydrocarbon-substituted polysiloxanes whose polymeric chains comprise one or more types of substituted siloxy units such as dimethylsiloxy, diethylsiloxy, diphenylsiloxy, methylvinylsiloxy, ethylvinylsiloxy, methylphenylsiloxy, and the like dihydrocarbonsiloxy units. Such hydroxy end-blocked polysiloxane oils can be prepared in a manner similar to that described below. By way of illustration a hydroxy end-blocked polysiloxane oil containing dimethylsiloxane units and ethylvinylsiloxane units can be prepared by heating a mixture of the cyclic tetramer of dimethylsiloxane (octamethylcyclotetrasiloxane) with the cyclic tetramer of ethylvinylsiloxane (tetraethyltetravinylcyclotetrasiloxane) and water in the presence of a catalyst, for example, ammonium hydroxide. The relative amounts of the various dihydrocarbonsiloxy units which can be present in a hydroxy end-blocked polysiloxane oil can vary over a wide range without materially affecting the properties of the improved siloxane elastomer of my invention.

Referring particularly to a hydroxy end-blocked dimethylpolysiloxane oil as an illustrative example, such oils have molecular weights of from about 300 to about 1500 and above, preferably from about 900 to about 1300 and contain hydroxy groups in an amount by weight of the oil from about 1 percent up to about 10 percent, preferably from about 2.4 percent to about 3.5 percent. When hydroxy end-blocked polysiloxane oils contain hydrocarbon substituents other than, or in addition to, methyl groups, the molecular weight of the oils will, of course, lie in a range above that described for the dimethylpolysiloxane oils. In a like manner the hydroxy content of such polysiloxane oils would be relatively lower in value when the hydrocarbon substituents comprise groups other than, or in addition to, methyl groups. In no event will the hydroxy content of the hydroxy end-blocked dihydrocarbon-substituted polysiloxane oils be greater than 10 percent and preferably not above 3.5 percent, by weight thereof.

The amount of such plasticizer employed can be from 1 to 100 parts by weight of the gum. Preferably the plasticizer is employed in amounts of from 4 to 80 parts by weight plasticizer per 100 parts by weight of the gum.

Siloxane elastomers produced in accordance with the instant invention find wide use as wire and cable insulations, as well as vibration damping mounts, gaskets, seals, coating and the like applications requiring resistance to low and high temperatures.

The following examples serve to illustrate the invention, all parts are by weight unless otherwise specified.

EXAMPLE 1

Octamethylcyclotetrasiloxane (135 g.), hexaethylcyclotrisiloxane (15 g.) and a diethylsiloxane oil containing 35 percent by weight of combined ethylvinylsiloxane units (1.5 g.) and having a viscosity of 75 cc. at room temperature were charged into a 500 cc. glass reaction vessel. The mixture was heated to 150° C., potassium dimethylsilanolate, $[KO[(CH_3)_2SiO]_tK$ where ($t$) is an integer having an average value of about 34], equivalent to 35 parts potassium per million parts of the total siloxanes and 0.05 gram of anhydrous cesium hydroxide were added to the mixture with stirring. The resulting mixture was heated at 150° C. for 1.5 hours to yield a clear, colorless, firm, toluene-soluble polysiloxane gum having a molecular weight of about 450,000. This gum was composed of dimethylsiloxane units, diethylsiloxane units and ethylvinylsiloxane units, the diethylsiloxane units being present in an amount equal to approximately 10.54 percent by weight of the total polymer; and the ethylvinylsiloxane units comprising approximately 0.35 percent by weight of the total polysiloxane gum and the remainder being dimethylsiloxane units.

Several additional polysiloxane gums having varying diethylsiloxane content were prepared in the above manner. The compositions of these gums are given in Table I and labelled A to E.

EXAMPLE 2

A one gallon tin coated reaction vessel was charged with a mixture of cyclic methylethylsiloxanes, $$[(CH_3)C_2H_5SiO]_{3,4}$$

(368 g.), tetramethyltetravinylcyclotetrasiloxane, $$[CH_3(C_2H_3)SiO]_4$$

and octamethylcyclotetrasiloxane, $[(CH_3)_2SiO]_4$. The reaction vessel and contents were heated to 145° C. and sufficient potassium dimethylsilanolate, $$[KO((CH_3)_2SiO)_tK$$

when ($t$) is a previously defined], was added so that the mixture contained 30 parts potassium (K) per million parts of the total siloxanes. The resulting mixture was then heated to 150° C. for 1 hour with stirring. The reaction vessel was then sealed and heated to 150° C. for 3 hours. On cooling, a water, white polysiloxane gum was obtained, said gum contained 0.2 percent by weight methylvinylsiloxane units, 12 percent by weight ethylmethylsiloxane units and 87.8 percent by weight dimethylsiloxane units.

EXAMPLE 3

Polysiloxane gum "A" containing 10.54 percent by weight diethylsiloxane units, 0.35 percent by weight ethylvinylsiloxane units and 89.11 percent by weight dimethylsiloxane units (145 g.) was compounded with finely divided alumina (Alon "C," 36.25 g., 25 parts per 100 parts siloxane) and a high abrasive furnace carbon black (Philblack "O," 29 g., 20 parts per 100 parts siloxane) and dicumylperoxide (1.45 g.) on a water-cooled six inch, 2 roll rubber mill (about 20 minutes milling time) at ambient temperature. After the ingredients were well mixed, the compound was sheeted from the mill and cured in a mold (6" x 6" x .075") for 16 minutes at 174° F. The elastomer thus prepared was postcured in a forced-draft for 24 hours at 480° F. The physical properties of this elastomer designated "A" are given in Table II.

EXAMPLE 4

Polysiloxane gum stock "B" containing 5.6 weight percent diethylsiloxane units, and 0.35 weight percent ethylvinylsiloxane units, and 94.05 weight percent dimethylsiloxane units (100 parts) was compounded with finely divided alumina (25 parts) and a finely divided abrasive furnace carbon black (20 parts) and dicumyl peroxide (1 part) according to the procedure of Example 3. The compound was then cured to an elastomer according to the procedure of Example 3. The physical properties of the elastomer designated "B" are given in Table II.

TABLE II

| Elastomer | Mold Cured Properties | | Elongation at break, percent | Postcured 24 hr. at 480° F. | | | Postcured +70 hrs. at 450° F. | | | Postcured +336 hrs. at 450° F | | |
|---|---|---|---|---|---|---|---|---|---|---|---|---|
| | Hardness Shore A | Tensile, p.s.i. | | Hardness Shore A | Tensile, p.s.i. | Elongation at break, percent | Hardness Shore A | Tensile, p.s.i. | Elongation at break, percent | Hardness Shore A | Tensile, p.s.i. | Elongation at break, percent |
| A | 35 | 394 | 400 | 57 | 276 | 200 | | | | | | |
| B | 35 | 737 | 475 | 47 | 655 | 275 | | | | | | |
| C | 42 | 435 | 330 | 65 | 485 | 200 | 73 | 470 | 120 | 90 | 420 | 30 |
| D | 41 | 500 | 375 | 63 | 500 | 175 | 73 | 515 | 130 | 90 | 590 | 40 |
| E | 43 | 430 | 305 | 65 | 475 | 160 | 73 | 520 | 110 | 90 | 615 | 45 |
| F | 35 | 400 | 420 | 65 | 390 | 200 | 76 | 405 | 90 | 90 | 350 | 20 |
| G | 36 | 390 | 405 | 64 | 450 | 200 | 74 | 370 | 90 | 90 | 425 | 25 |
| H | 35 | 475 | 435 | 66 | 410 | 160 | 77 | 365 | 70 | 90 | 455 | 40 |

NOTE.—All physical properties in the above table were measured at room temperature.

Several additional polysiloxane gums of varying ethylmethylsiloxane content were prepared in the above manner. The compositions of these gums are given in Table I and labeled F to H.

TABLE I

| Gum | Weight-percent | | | | Mole-percent Si-bonded R groups | | |
|---|---|---|---|---|---|---|---|
| | (1) | (2) | (3) | (4) | Mole-percent $CH_3$ group | Mole-percent $C_2H_5$ group | Mole-percent $CH_2=CH$ groups |
| A | 89.11 | 10.54 | | .35 | 91.85 | 8.01 | .13 |
| B | 94.05 | 5.6 | | .35 | 95.61 | 4.26 | .13 |
| C | 94.24 | 5.56 | | .20 | 95.81 | 5.1 | .09 |
| D | 92.93 | 6.97 | | .20 | 94.76 | 5.15 | .09 |
| E | 89.10 | 10.70 | | .20 | 91.91 | 8.0 | .09 |
| F | 90.22 | | 9.58 | .20 | 95.81 | 4.1 | .09 |
| G | 87.30 | | 12.00 | .20 | 94.76 | 5.15 | .09 |
| H | 81.30 | | 18.50 | .20 | 91.91 | 8.0 | .09 |

(1) $(CH_3)_2SiO$ units.
(2) $(C_2H_5)_2SiO$ units.
(3) $CH_3(C_2H_5)SiO$ units.
(4) $(CH_3)(CH_2=CH)SiO$ units or $(C_2H_5)(CH_2=CH)SiO$ units.

EXAMPLE 5

Polysiloxane gums C, D, E, F and G were compounded on a 2 roll rubber mill according to the procedure of Example 3, according to the following recipe.

| | Parts |
|---|---|
| Polysiloxane gum | 100 |
| Alumina | 25 |
| Carbon black | 20 |
| Hydroxy fluid [1] | 10 |
| Dicumyl peroxide | 1 |

[1] A polydimethylsiloxane having hydroxyl groups bonded to each terminal silicon atom thereof, having the average formula $HO[(CH_3)_2SiO]_{16.0}$—H.

The compositions were cured to elastomers according to the procedure of Example 3. The physical properties of the elastomers are given in Table II, each elastomer being designated by the same letter as the polysiloxane gum employed in the recipe.

Low temperature properties

The low temperature properties of the siloxane elastomers of Table II were measured and the results are shown below:

| Elastomer | Mole—Percent[a] Ethyl groups | Transition Points (° F.)[b] |
|---|---|---|
| A | 8.01 | −215 |
| B | 4.26 | −124 |
| C | 4.1 | [c]−75 |
| D | 5.15 | [c]−75 |
| E | 8.0 | [c]−140 |
| F | 4.1 | [c]−75 |
| G | 5.15 | [c]−75 |
| H | 8.0 | [c]−140 |

[a] Based on total number of hydrocarbon groups.
[b] Brittle Points run on a Gehman Tortional Apparatus. Per Gehman Low Temperature Flex Text (ASTM D–1053–58–T).
[c] Samples tested after 1 hour exposure to the temperature as compared to the 5 minute exposure set forth in ASTM method D–1053–58–T.

The solvent resistance of the elastomers was evaluated by measuring the volume swell after immersion in A.S.T.M. No. 3 oil for 70 hours at 300° F. according to the procedure given in A.S.T.M. D–471–59T.

The results are tabulated in the following table.

TABLE III.—SOLVENT RESISTANCE OF ELASTOMERS

| Elastomer: | Volume change, percent |
|---|---|
| A | +46 |
| B | +40 |
| D | 35.9 |
| E | 40.6 |
| G | 36.8 |
| H | 37.8 |
| Conventional dimethylsiloxane elastomer | +41 |
| A dimethylsiloxane elastomer containing 12% by weight of combined diphenylsiloxane units | +79 |

The terms and expressions employed in the examples and throughout this specification are to be interpreted as indicated in the following glossary.

*Glossary*

A. Miniature penetrometer: The miniature penetrometer used in determining the hardness of organopolysiloxane gums is a modification of the standard miniature penetrometer used in measuring the hardness or viscosity of a plastic substance, such as asphalt, made in accordance with suggestions contained in the article "Miniature Penetrometer for Determining the Consistency of Lubricating Greases" by Kaufman, Gus; Finn, W. J. and Harrington, R. J., Industrial and Engineering Chemistry, Analytical Edition, 11, 108–110, 1939.

In the modified miniature penetrometer, an aluminum plunger and penetrometer cone weighing 20 grams has been substituted for the steel plunger and penetrometer cone, weighing 150 grams, of the standard miniature penetrometer. Otherwise, the modified miniature penetrometer is of the same structure and dimensions as that described in the aforementioned article.

An organopolysiloxane gum is tested for hardness by lowering the penetrometer cone with the plunger into contact with the surface of the gum with the indicator reading zero. Then the penetrometer cone with its plunger is released to permit downward movement under the influence of gravity for a period of ten seconds, and the depth of penetration is shown in millimeters on an indicator associated with the device. The indicated penetration is identified as the miniature penetrometer reading (MPR).

B. Elongation (ASTM D–412–51T): Amount of stretch of a sample under a tensile force expressed as a percentage of the original length:

$$\frac{\text{Stretched length} - \text{original length}}{\text{Original length}} \times 100$$

C. Hardness (ASTM D–676–49T): Degree of indentation produced by a plunger or indentor under a specific load. Measured with a Shore A of 100.

D. Tensile strength (ASTM D–412–49T): The force necessary to rupture a rubber specimen when stretched to the breaking point divided by the original cross-sectional area (lb./sq. inch).

What is claimed is:

1. A composition of matter curable to a siloxane elastomer which comprises (1) 100 parts by weight of a copolymeric dihydrocarbonpolysiloxane having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 8.1 mole percent of the total number of hydrocarbon groups are ethyl groups, from 0.0185 to 0.5 percent of the total number of hydrocarbon groups are olefinically unsaturated groups and the remainder are methyl groups, (2) from 10 to 80 parts by weight per 100 parts by weight of copolymeric dihydrocarbonpolysiloxane of a filler material, said filler material comprising a mixture of alumina and carbon black said mixture comprising from 9.1 to 90.9 percent by weight carbon black and from 90.9 to 9.1 percent by weight alumina, and (3) an organic peroxide dihydrocarbonpolysiloxane gum curing catalyst.

2. A composition of matter curable to a siloxane elastomer which comprises (1) 100 parts by weight of a copolymeric dihydrocarbonpolysiloxane having a hydrocarbon substituent to silicon atom ratio of from 1.95 to 2.05 and whose hydrocarbon substituents comprise methyl, ethyl and vinyl groups and wherein from 4.0 to 8.1 mole percent of the total number of hydrocarbon groups are ethyl groups, from 0.0185 to 0.5 percent of the total number of hydrocarbon groups are vinyl groups and the remainder are methyl groups, (2) from 10 to 80 parts by weight per 100 parts by weight of copolymeric dihydrocarbonpolysiloxane of a filler material said filled material comprising a mixture comprising from 9.1 to 90.9 percent by weight carbon black and from 90.9 to 9.1 percent by weight alumina, and (3) dicumyl peroxide.

3. A composition of matter curable to a siloxane elastomer which comprises (1) 100 parts by weight of a copolymeric dihydrocarbonpolysiloxane having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 8.1 mole percent of the total number of hydrocarbon groups are ethyl groups, from 0.0185 to 0.5 percent of the total number of hydrocarbon groups are olefinically unsaturated groups and the remainder are methyl groups, (2) from 20 to 40 parts by weight per 100 parts by weight of copolymeric dihydrocarbonpolysiloxane of a filler material, said filler material comprising a mixture of alumina and carbon black said mixture comprising from 37.5 to 62.5 percent by weight carbon black and from 62.5 to 37.5 percent by weight of alumina, and (3) an organic peroxide dihydrocarbonpolysiloxane gum curing catalyst.

4. A composition of matter curable to a siloxane elastomer which comprises (1) 100 parts by weight of a copolymeric dihydrocarbonpolysiloxane having a hydrocarbon sustituent to silicon atom ratio of from 1.95 to 2.05 and whose hydrocarbon substituents comprise methyl, ethyl and vinyl groups and wherein from 4.0 to 8.1 mole percent of the total number of hydrocarbon groups are ethyl groups, from 0.0185 to 0.5 percent of the total number of hydrocarbon groups are vinyl groups and the remainder are methyl groups, (2) from 20 to 40 parts by weight per 100 parts by weight of copolymeric dihydrocarbonpolysiloxane of a filler material said filler material comprising a mixture of alumina and carbon black said mixture comprising from 37.5 to 62.5 percent by weight carbon black and from 62.5 to 37.5 percent by weight alumina, and (3) dicumyl peroxide.

5. A siloxane elastomer which comprises a heat-cured composition comprising 100 parts by weight of a copolymeric dihydrocarbonpolysiloxane having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups selected from the class consisting of vinyl, allyl and cyclohexenyl groups and wherein from 4.0 to 8.1 mole percent of the total number of hydrocarbon groups are ethyl groups, from 0.0185 to 0.5 mole percent of the total number of hydrocarbon groups are olefinically unsaturated groups and the remainder are methyl groups, (2) from 10 to 80 parts by weight per 100 parts by weight of copolymeric dihydrocarbonpolysiloxane of a filler material, said filler material comprising a mixture of alumina and carbon black said mixture comprising from 9.1 to 90.9 percent by weight carbon black and from 90.9 to 9.1 percent by weight alumina, and (3) an organic peroxide dihydrocarbonpolysiloxane gum curing catalyst.

6. A siloxane elastomer which comprises a heat-cured composition comprising (1) 100 parts by weight of a copolymeric dihydrocarbon polysiloxane having a hydrocarbon substituent to silicon atom ratio of from 1.95 to 2.05 and whose hydrocarbon substituents comprise methyl, ethyl and vinyl groups and wherein from 4.0 to 8.1 mole percent of the total number of hydrocarbon groups are ethyl groups, from 0.0185 to 0.5 percent of the total number of hydrocarbon groups are vinyl groups and the remainder are methyl groups, (2) from 10 to 80 parts by weight per 100 parts by weight of copolymeric dihydrocarbonpolysiloxane of a filler material, said filler material comprising a mixture of alumina and carbon black said mixture comprising from 9.1 to 90.9 percent by weight carbon black and from 90.9 to 9.1 percent by weight of alumina, and (3) dicumyl peroxide.

7. A siloxane elastomer which comprises a heat-cured composition of matter comprising (1) 100 parts by weight of a copolymeric dihydrocarbonpolysiloxane having a hydrocarbon substituent to silicon atom ratio of from 1.95 to 2.05 and whose hydrocarbon substituents comprise saturated hydrocarbon groups selected from the class consisting of methyl and ethyl groups and olefinically unsaturated hydrocarbon groups selected from the class consisting of vinyl, allyl and cyclohexenyl groups and wherein from 4.0 to 8.1 mole percent of the total number of hydrocarbon groups are ethyl groups from 0.0185 to 0.5 percent of the total number of hydrocarbon groups are olefinically unsaturated groups and the remainder are methyl groups, (2) from 20 to 40 parts by weight per 100 parts by weight of copolymeric dihydrocarbonpolysiloxane of a filler material, said filler material comprising a mixture of alumina and carbon black said mixture comprising from 37.5 to 62.5 percent by weight carbon black and from 62.5 to 37.5 percent by weight alumina, and (3) an organic peroxide dihydrocarbonpolysiloxane gum curing catalyst.

8. A siloxane elastomer which comprises a heat-cured composition comprising (1) 100 parts by weight of a copolymeric dihydrocarbonpolysiloxane having a hydrocarbon substituent to silicon atom ratio of from 1.95 to 2.05 and whose hydrocarbon substituents comprise methyl, ethyl and vinyl groups and wherein from 4.0 to 8.1 mole percent of the total number of hydrocarbon groups are ethyl groups, from 0.0185 to 0.5 percent of the total number of hydrocarbon groups are vinyl unsaturated groups and the remainder are methyl groups, (2) from 20 to 40 parts by weight per 100 parts by weight of copolymeric dihydrocarbonpolysiloxane of a filler material, said filler material comprising a mixture of alumina and carbon black said mixture comprising from 37.5 to 62.5 percent by weight carbon black and from 62.5 to 37.5 percent by weight alumina, and (3) dicumyl peroxide.

References Cited by the Examiner
UNITED STATES PATENTS

| | | | |
|---|---|---|---|
| 2,445,794 | 7/1948 | Marsden | 260—46.5 |
| 2,480,620 | 8/1949 | Warrick | 260—37 |
| 2,495,363 | 1/1950 | Barry et al. | 260—37 |
| 2,521,528 | 9/1950 | Marsden | 260—37 |
| 2,671,069 | 3/1954 | Savage | 260—37 |
| 2,816,089 | 12/1957 | Willis | 260—37 |
| 2,838,472 | 6/1958 | Lucas | 260—37 |
| 2,849,473 | 8/1958 | Bailey et al. | 260—46.5 |
| 2,853,503 | 9/1958 | Bailey et al. | 260—46.5 |

OTHER REFERENCES

"Silicones" (Fordham), published by George Newnes Ltd., London, 1960.

"Inorganic Polymers" (Stone et al.), published by Academic Press, New York, 1962, pages 288–289 relied on.

MORRIS LIEBMAN, *Primary Examiner.*

MILTON STERMAN, LESLIE H. GASTON, ALEXANDER H. BRODMERKEL, *Examiners.*

UNITED STATES PATENT OFFICE
CERTIFICATE OF CORRECTION

Patent No. 3,234,175

February 8, 1966

Roscoe A. Pike

It is hereby certified that error appears in the above numbered patent requiring correction and that the said Letters Patent should read as corrected below.

Column 2, line 72, for "allyl" read -- alkyl --; column 4, line 25, for "provided" read -- provide --; column 5, line 64, for "th elike" read -- the like --; column 6, line 5, after "allyl," insert -- and --; column 7, line 21, for "when (t) is a" read -- where (t) is as --; column 10, lines 18, 36, 54 and 73, column 11, line 36, and column 12, lines 2 and 20, after "0.5", each occurrence, insert -- mole --.

Signed and sealed this 17th day of January 1967.

(SEAL)

Attest:

ERNEST W. SWIDER
Attesting Officer

EDWARD J. BRENNER
Commissioner of Patents